(12) United States Patent
Vance, Sr.

(10) Patent No.: US 6,393,880 B1
(45) Date of Patent: May 28, 2002

(54) AIRCRAFT ANTI-THEFT DEVICE

(76) Inventor: David E. Vance, Sr., 347 E. Plymouth St. #6, Inglewood, CA (US) 90302-2459

( * ) Notice: Subject to any disclaimer, the term of this patent is extended or adjusted under 35 U.S.C. 154(b) by 0 days.

(21) Appl. No.: 09/512,681

(22) Filed: Feb. 25, 2000

(51) Int. Cl.⁷ .............................. F16C 3/00; G05G 5/00
(52) U.S. Cl. .............................. 70/174; 70/182; 70/183; 70/184; 70/202
(58) Field of Search .................... 70/174, 182, 183, 70/184, 185, 202, 211, 212

(56) References Cited

U.S. PATENT DOCUMENTS

| | | | |
|---|---|---|---|
| 1,250,668 A | 12/1917 | Rzesuto | |
| 3,330,504 A | 7/1967 | Lewis | |
| 3,795,122 A * | 3/1974 | Lipschutz | 70/182 |
| 4,208,026 A * | 6/1980 | Reynolds | 70/200 |
| 4,299,361 A | 11/1981 | Webb | |
| 4,552,000 A * | 11/1985 | Lipschutz | 70/185 |
| 5,042,754 A * | 8/1991 | Heath | 70/163 |
| 5,129,603 A | 7/1992 | Wippler | |
| 5,415,019 A * | 5/1995 | Perez | 70/210 |
| 5,908,178 A * | 6/1999 | Sandhagen | 70/57 |
| 5,953,941 A * | 9/1999 | Freund | 70/199 |
| 6,234,039 B1 * | 5/2001 | Garnault et al. | 70/184 |

* cited by examiner

Primary Examiner—William A. Cuchlinski, Jr.
Assistant Examiner—Gertrude Arthur

(57) ABSTRACT

A aircraft anti-theft device for immobilizing the yoke of an aircraft. The aircraft anti-theft device includes a device for immobilizing the yoke control of an aircraft. The yoke control has a gust lock hole for holding the yoke in a stationary position. The device has a sleeve for wrapping about the yoke control. The sleeve has an interior channel for receiving a portion of the yoke control. The sleeve is divided along its longitudinal axis to form a first and second sections. The first and second sections each have a pair of end edges, a first side edge, and a second side edge. A lock locks the first and second sections in a closed position. A pin for insertion into the gust lock is fixedly coupled to an interior surface of the first section of the sleeve. The pin protrudes from the interior surface of the sleeve. The first and second sections are placed around the yoke control such that the pin enters the gust lock.

6 Claims, 3 Drawing Sheets

AIRCRAFT ANTI-THEFT DEVICE

BACKGROUND OF THE INVENTION

1. Field of the Invention

The present invention relates to anti-theft devices and more particularly pertains to a new aircraft anti-theft device for immobilizing the yoke of an aircraft.

2. Description of the Prior Art

The use of anti-theft devices is known in the prior art. More specifically, anti-theft devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,299,361; U.S. Pat. No. 5,042,754; U.S. Pat. No. 5,129,603; U.S. Pat. No. 3,330,504; U.S. Pat. No. 1,250,668; Foreign Pat. WO 89/09150, Foreign Pat. EP 0 414 531 A2.

While these devices fulfill their respective, particular objectives and requirements, the aforementioned patents do not disclose a new aircraft anti-theft device. The inventive device includes a device for immobilizing the yoke control of an aircraft. The yoke control has a gust lock hole for holding the yoke in a stationary position. The device has a sleeve for wrapping about the yoke control. The sleeve has an interior channel for receiving a portion of the yoke control. The sleeve is divided along its longitudinal axis to form a first and second sections. The first and second sections each have a pair of end edges, a first side edge, and a second side edge. A lock locks the first and second sections in a closed position. A pin for insertion into the gust lock is fixedly coupled to an interior surface of the first section of the sleeve. The pin protrudes from the interior surface of the sleeve. The first and second sections are placed around the yoke control such that the pin enters the gust lock.

In these respects, the aircraft anti-theft device according to the present invention substantially departs from the conventional concepts and designs of the prior art, and in so doing provides an apparatus primarily developed for the purpose of immobilizing the yoke of an aircraft.

SUMMARY OF THE INVENTION

In view of the foregoing disadvantages inherent in the known types of anti-theft devices now present in the prior art, the present invention provides a new aircraft anti-theft device construction wherein the same can be utilized for immobilizing the yoke of an aircraft.

The general purpose of the present invention, which will be described subsequently in greater detail, is to provide a new aircraft anti-theft device apparatus and method which has many of the advantages of the anti-theft devices mentioned heretofore and many novel features that result in a new aircraft anti-theft device which is not anticipated, rendered obvious, suggested, or even implied by any of the prior art anti-theft devices, either alone or in any combination thereof.

To attain this, the present invention generally comprises a device for immobilizing the yoke control of an aircraft. The yoke control has a gust lock hole for holding the yoke in a stationary position. The device has a sleeve for wrapping about the yoke control. The sleeve has an interior channel for receiving a portion of the yoke control. The sleeve is divided along its longitudinal axis to form a first and second sections. The first and second sections each have a pair of end edges, a first side edge, and a second side edge. A lock locks the first and second sections in a closed position. A pin for insertion into the gust lock is fixedly coupled to an interior surface of the first section of the sleeve. The pin protrudes from the interior surface of the sleeve. The first and second sections are placed around the yoke control such that the pin enters the gust lock.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new aircraft anti-theft device apparatus and method which has many of the advantages of the anti-theft devices mentioned heretofore and many novel features that result in a new aircraft anti-theft device which is not anticipated, rendered obvious, suggested, or even implied by any of the prior art anti-theft devices, either alone or in any combination thereof.

It is another object of the present invention to provide a new aircraft anti-theft device which may be easily and efficiently manufactured and marketed.

It is a further object of the present invention to provide a new aircraft anti-theft device which is of a durable and reliable construction.

An even further object of the present invention is to provide a new aircraft anti-theft device which is susceptible of a low cost of manufacture with regard to both materials and labor, and which accordingly is then susceptible of low prices of sale to the consuming public, thereby making such aircraft anti-theft device economically available to the buying public.

Still yet another object of the present invention is to provide a new aircraft anti-theft device which provides in the apparatuses and methods of the prior art some of the advantages thereof, while simultaneously overcoming some of the disadvantages normally associated therewith.

Still another object of the present invention is to provide a new aircraft anti-theft device for immobilizing the yoke of an aircraft.

Yet another object of the present invention is to provide a new aircraft anti-theft device which includes a device for immobilizing the yoke control of an aircraft. The yoke control has a gust lock hole for holding the yoke in a stationary position. The device has a sleeve for wrapping about the yoke control. The sleeve has an interior channel for receiving a portion of the yoke control. The sleeve is divided along its longitudinal axis to form a first and second sections. The first and second sections each have a pair of end edges, a first side edge, and a second side edge. A lock locks the first and second sections in a closed position. A pin for insertion into the gust lock is fixedly coupled to an interior surface of the first section of the sleeve. The pin protrudes from the interior surface of the sleeve. The first and second sections are placed around the yoke control such that the pin enters the gust lock.

Still yet another object of the present invention is to provide a new aircraft anti-theft device that will hold the gust lock in the correct position when the aircraft is grounded.

Even still another object of the present invention is to provide a new aircraft anti-theft device that can be easily adapted to fit all yokes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
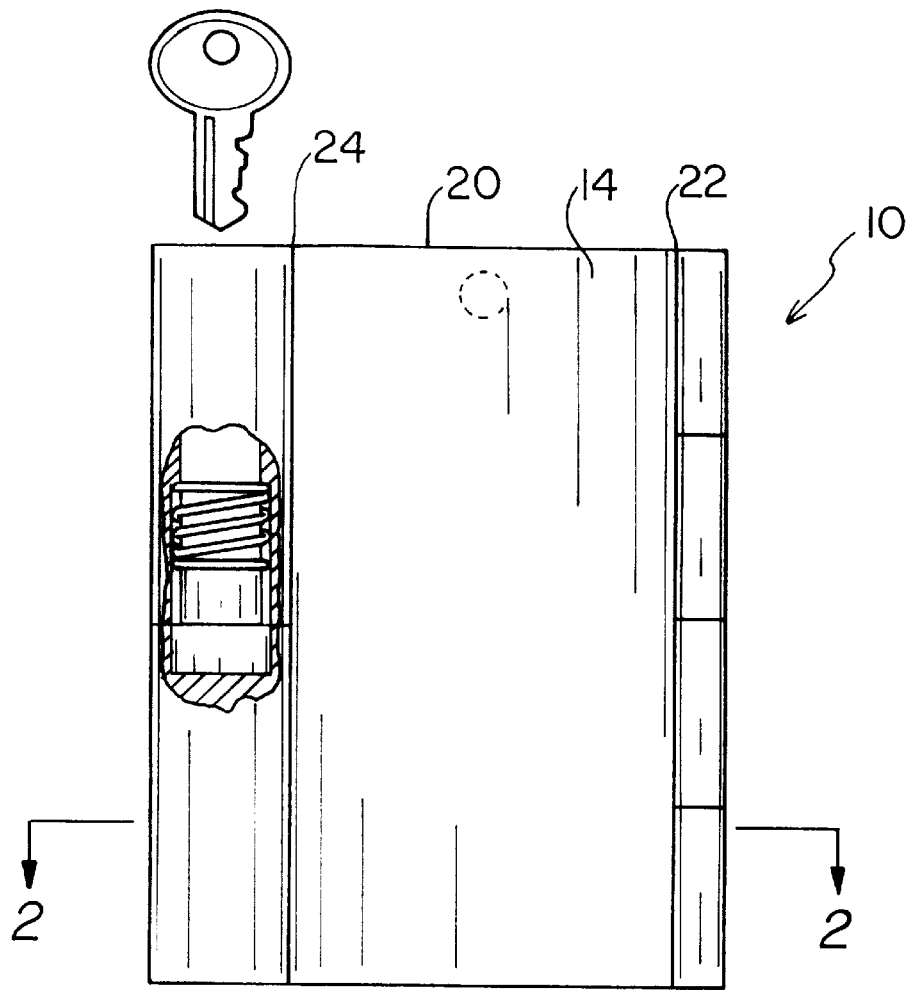
FIG. 1 is a schematic side view of a new aircraft anti-theft device according to the present invention.

With reference now to the drawings, and in particular to FIGS. 1 through 5 thereof, a new aircraft anti-theft device embodying the principles and concepts of the present invention and generally designated by the reference numeral 10 will be described.

As best illustrated in FIGS. 1 through 5, the aircraft anti-theft device 10 generally comprises a device for immobilizing the yoke control 12 of an aircraft. The yoke control has a gust lock hole for holding the yoke in a stationary position.

Figure 2:
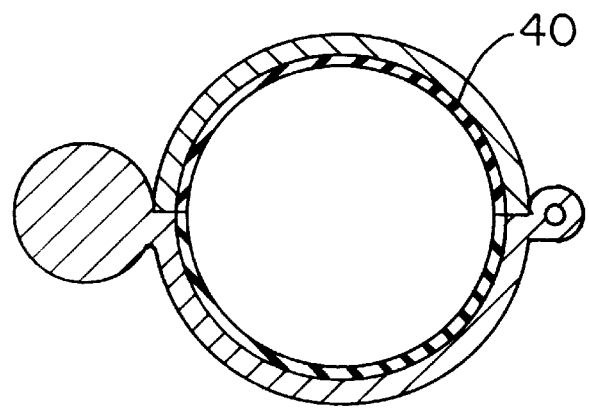
FIG. 2 is a schematic top view of the present invention.
Figure 3:
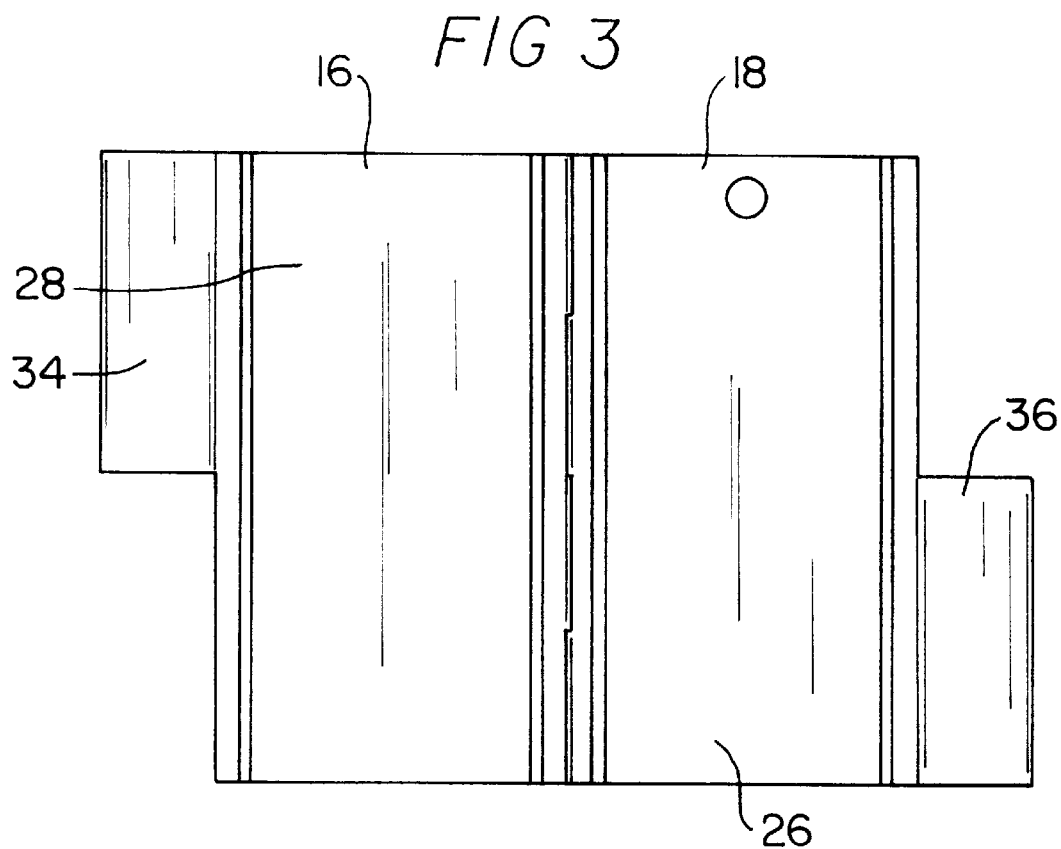
FIG. 3 is a schematic side view of the present invention in the open position.
Figure 4:
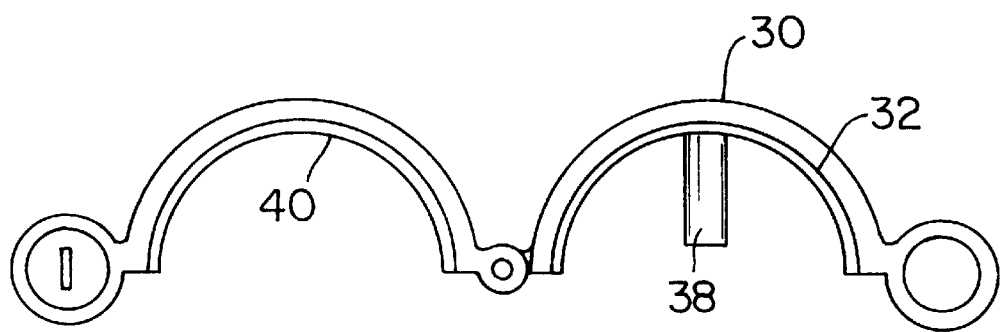
FIG. 4 is a schematic top view of the present invention in the open position.
Figure 5:
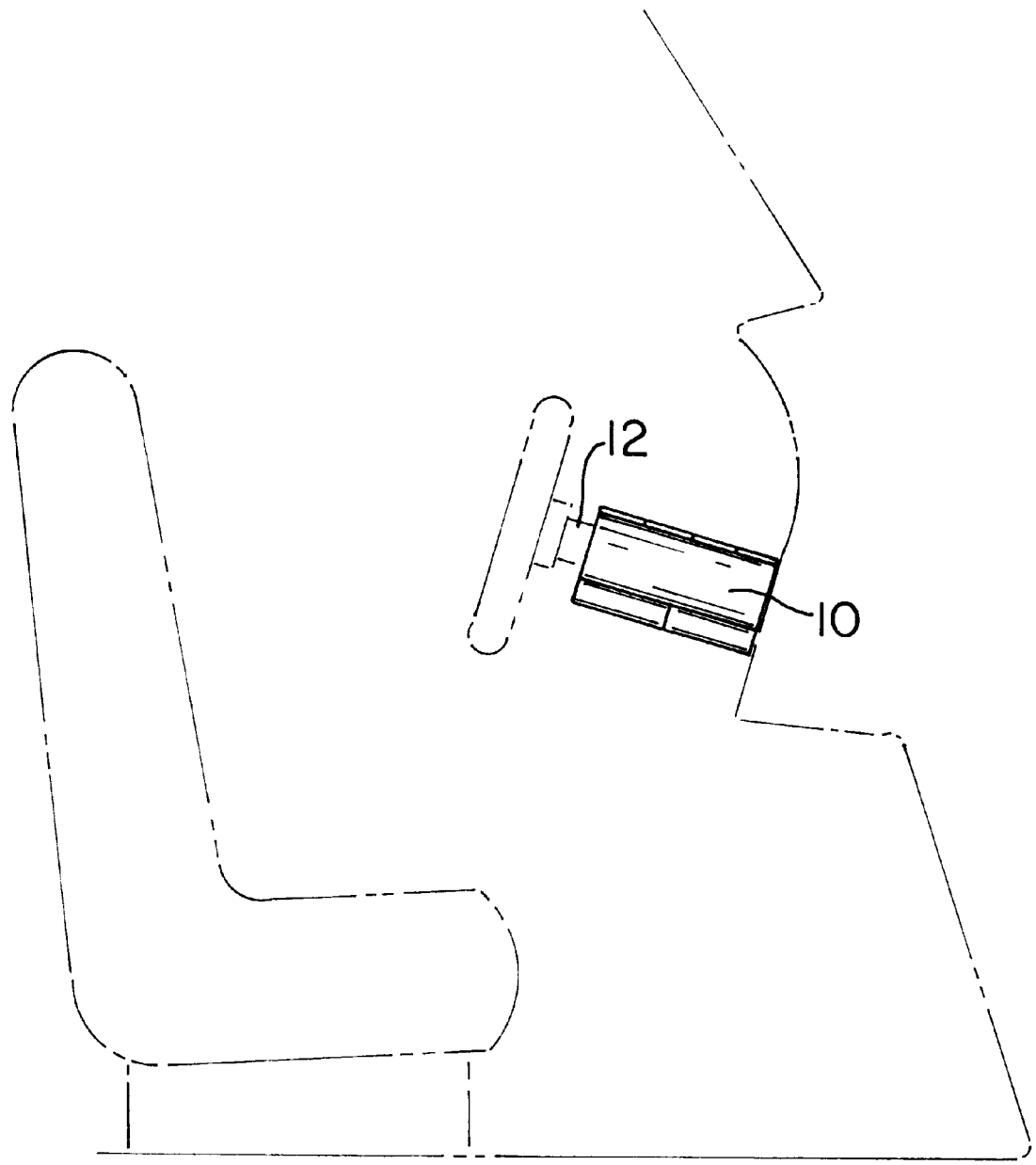
FIG. 5 is a schematic side view of the present invention on the yoke of an aircraft.

The device has a sleeve 14 for wrapping about the yoke control 12. The sleeve 14 has an interior channel for receiving a portion of the yoke control 12. The sleeve is divided along its longitudinal axis to form a first section 16 and a second section 18. The first 16 and second sections 18 each have a pair of end edges 20, a first side edge 22, a second side edge 24, a proximal portion 26 and a distal portion 28. The first 16 and second 18 sections are hingedly coupled together along a length of the first edges 22 such that the first 16 and second 18 sections may be moved between an open and closed position. The closed position is best depicted in FIGS. 1 and 2, the open position is best depicted in FIGS. 3 and 4. The first 16 and second sections 18 each have a generally hemicylindrical shape. Each of the first 16 and second sections 18 has an interior surface 30 and an exterior surface 32. Ideally the sleeve 14 is formed from steel or other metallic material.

A lock locks the first 16 and second 18 sections in a closed position. The lock has a male portion 34 and a female portion 36. The male portion 34 is fixedly mounted to the exterior surface of the first section 16 of the sleeve 14. The male portion of the lock is located generally in the distal portion 28 and adjacent to the second side edge 24 of the first section 16 of the sleeve 14. The female portion 36 of the lock is fixedly mounted to the exterior surface 30 of the second section 18 of the sleeve 14. The female portion 36 of the lock is generally located in the proximal portion 26 and adjacent to the second side edge 24 of the second section 18. The male 34 and female portions 36 of the lock are substantially adjacent to each other when the first 16 and the second 18 sections are in the closed position.

A pin 38 for insertion into the gust lock is fixedly coupled to the interior surface 32 of the second section 18 of the sleeve 14. The pin protrudes from the interior surface of the sleeve 14 and extends along a radius of the cylindrical interior surface of the sleeve. The pin 38 extends perpendicular to the longitudinal axis of the interior surface of the sleeve 14.

The first 16 and second sections 18 are placed around the yoke control 12 such that the pin 38 enters the gust lock.

Preferably, a protective coating 40 for protecting the yoke 12 from the sleeve 14 is on the interior surface 32 of the first 18 and second 20 sections of the sleeve 14. The protective coating 40 is ideally formed from an elastomeric material such as natural or synthetic rubber.

In use, the sleeve 14 is wrapped around the yoke control 12 such that the pin 38 enters the gust lock. The sleeve 14 is then closed and locked. In this position, the yoke control 12 cannot be moved which grounds the plane.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An aircraft anti-theft device for immobilizing the yoke control of an aircraft, the yoke control having a gust lock hole for holding the yoke in a stationary position, said device comprising:

a sleeve for wrapping about the yoke control, said sleeve having an interior channel for receiving a portion of said yoke control, said sleeve being divided along a longitudinal axis of said sleeve to form a first section and a second section of said sleeve, said first and second sections each having a pair of end edges, a first side edge, a second side edge;

a lock adapted for locking said first and second sections in a closed position;

a pin for insertion into the gust lock, said pin being fixedly coupled to an interior surface of said second section of said sleeve, said pin protruding from the interior surface of the sleeve; and wherein said first and second sections are placed around the yoke control such that said pin enters the gust lock.

2. The aircraft anti-theft device for immobilizing the yoke control of an aircraft as in claim 1, wherein said sleeve comprises:

a proximal portion and a distal portion, said first and second sections being hingedly coupled together along a length of said first edges such that said first and second sections may be moved between an open and closed position, said first and second sections each having a generally hemi-cylindrical shape, each of said first and second sections having an interior surface and an exterior surface.

3. The aircraft anti-theft device for immobilizing the yoke control of an aircraft as in claim 2, wherein said lock comprises:

said lock having a male portion and a female portion, said male portion being fixedly mounted to said exterior surface of said first section of said sleeve, said male portion of said lock being located generally in said distal portion and adjacent to said second side edge of said first section of said sleeve, said female portion of said lock being fixedly mounted to said exterior surface of said second section of said sleeve, said female portion of said lock being generally located in said proximal portion and adjacent to said second side edge of said second section.

4. The aircraft anti-theft device for immobilizing the yoke control of an aircraft as in claim 3, further comprising:

a protective coating for protecting the yoke from the sleeve, said coating being on an interior surface of said first and second sections of said sleeve, said protective coating being an elastomeric material.

5. The aircraft anti-theft device for immobilizing the yoke control of an aircraft as in claim 1, further comprising:

a protective coating for protecting the yoke from the sleeve, said coating being on an interior surface of said first and second sections of said sleeve, said protective coating being an elastomeric material.

6. An aircraft anti-theft device for immobilizing the yoke control of an aircraft, the yoke control having a gust lock hole for holding the yoke in a stationary position, said device comprising:

a sleeve for wrapping about the yoke control, said sleeve having an interior channel for receiving a portion of said yoke control, said sleeve being divided along a longitudinal axis of said sleeve to form a first section and a second section of said sleeve, said first and second sections each having a pair of end edges, a first side edge, a second side edge, a proximal portion and a distal portion, said first and second sections being hingedly coupled together along a length of said first edges such that said first and second sections may be moved between an open and closed position, said first and second sections each having a generally hemi-cylindrical shape, each of said first and second sections having an interior surface and an exterior surface;

a lock for locking said first and second sections in a closed position, said lock having a male portion and a female portion, said male portion being fixedly mounted to said exterior surface of said first section of said sleeve, said male portion of said lock being located generally in said distal portion and adjacent to said second side edge of said first section of said sleeve, said female portion of said lock being fixedly mounted to said exterior surface of said second section of said sleeve, said female portion of said lock being generally located in said proximal portion and adjacent to said second side edge of said second section, wherein said male and female portions of said lock are substantially adjacent to each other when said first and said second sections are in said closed position;

a pin for insertion into the gust lock, said pin being fixedly coupled to said interior surface of said second section of said sleeve, said pin protruding from the interior surface of the sleeve, said pin extending along a radius of the cylindrical interior surface of said sleeve, said pin extending perpendicular to said longitudinal axis of said interior surface of said sleeve;

wherein said first and second sections are placed around the yoke control such that said pin enters the gust lock; and a protective coating for protecting the yoke from the sleeve, said coating being on said interior surface of said first and second sections of said sleeve, said protective coating being an elastomeric material.

* * * * *